Sept. 22, 1953  J. H. STRESEN REUTER ET AL  2,652,813
PRESSURE RATIO SENSING DEVICE
Filed Oct. 24, 1951  2 Sheets-Sheet 1
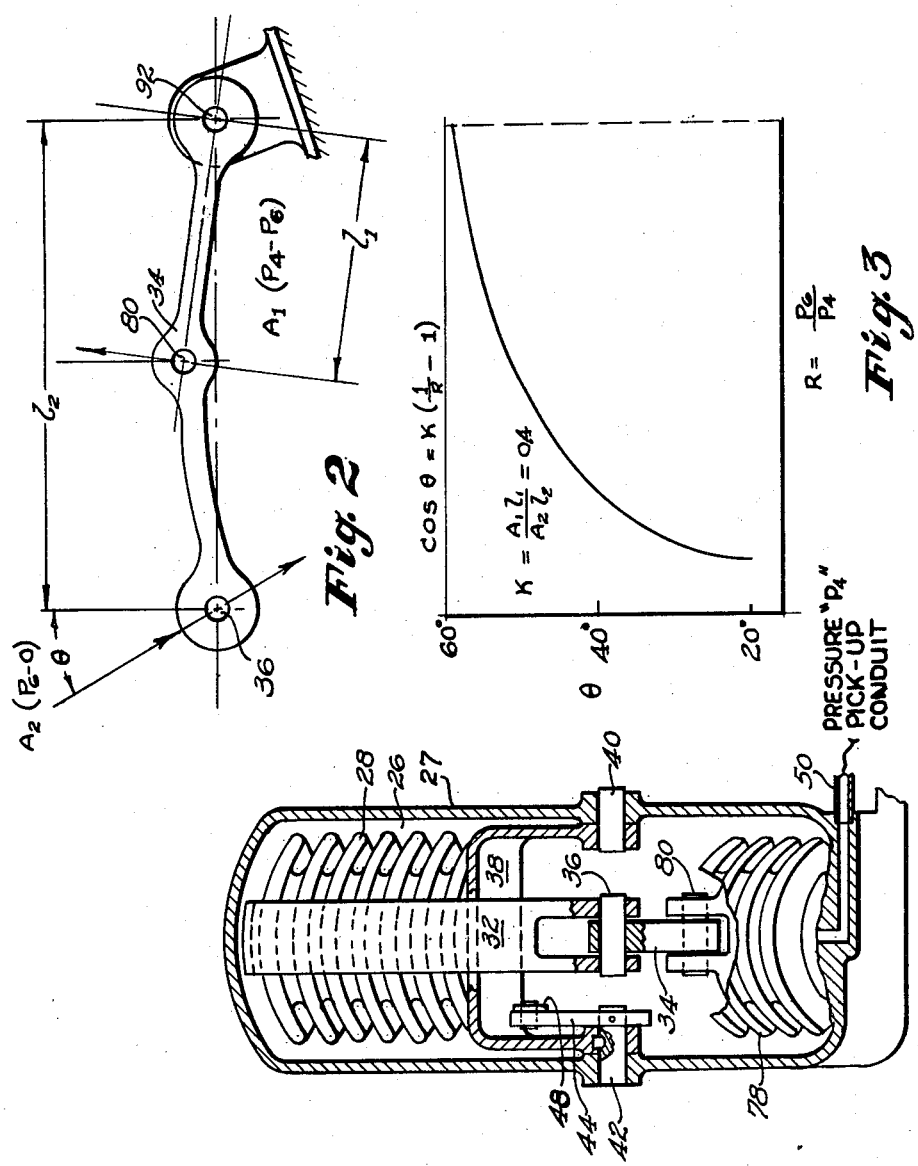
J. H. Stresen Reuter
J. T. Karpus Jr.
INVENTORS
BY Stanley M. Udall
ATTORNEY

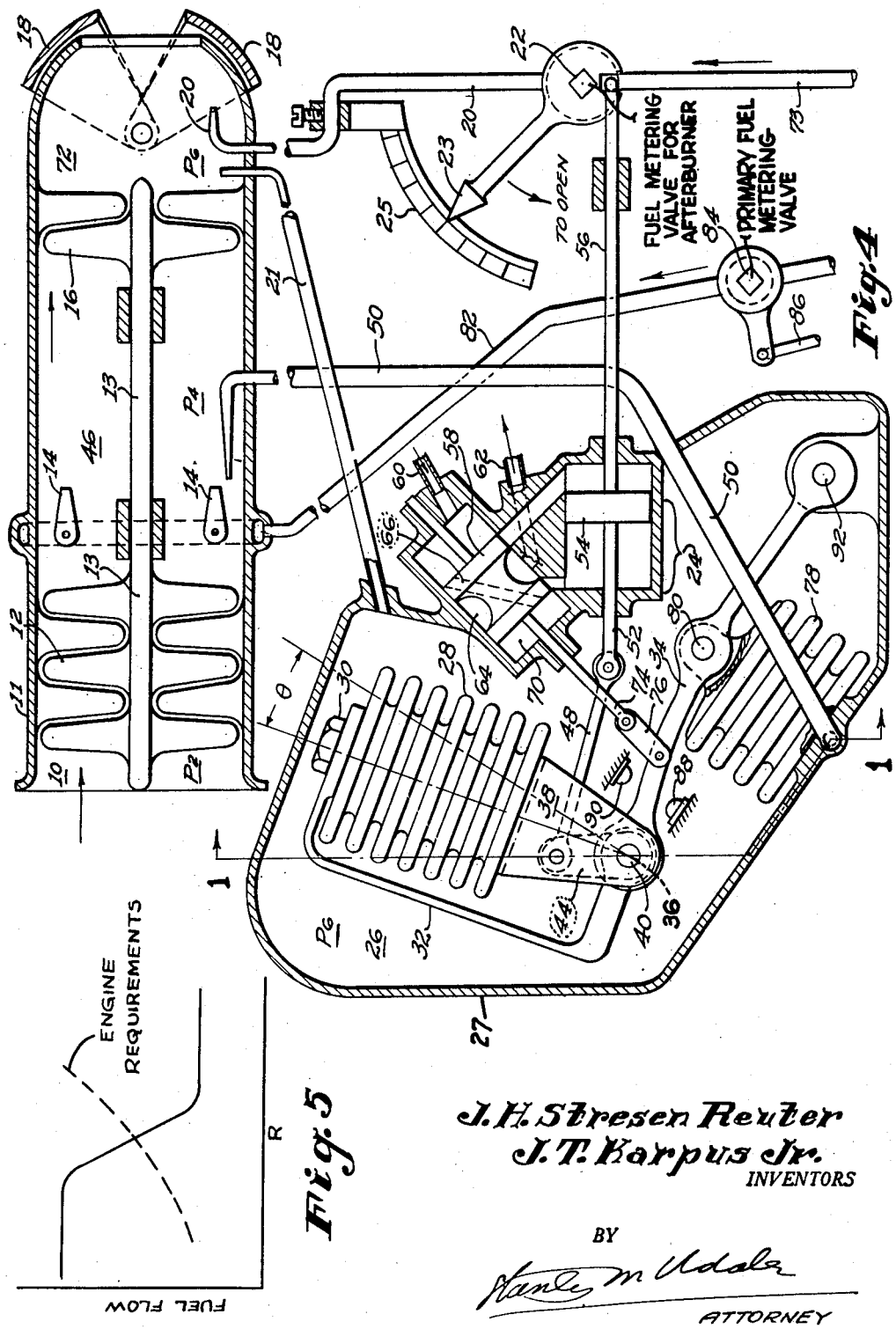

Patented Sept. 22, 1953

2,652,813

UNITED STATES PATENT OFFICE

2,652,813

PRESSURE RATIO SENSING DEVICE

John H. Stresen Reuter, Birmingham, and John T. Karpus, Jr., Detroit, Mich., assignors to Holley Carburetor Company, Detroit, Mich., a corporation of Michigan Application October 24, 1951, Serial No. 252,848

4 Claims. (Cl. 121—41)

The object of this invention is a mechanism that will respond to two variable independent pressures acting as input signals and the response will be such that a mechanical displacement will occur in a manner which is some function of the ratio of these two pressures.

Pressure ratio sensing devices normally consist of the variable lever arm type; that is, in order to determine the ratio of two variable pressures, the common practice is to vary the lever arm as by moving the fulcrum and, by so doing, the ratio of the lever arms corresponding to equilibrium can be used as an indication of the ratio of the two pressures. In this type of device the frictional forces encountered are of a high order of magnitude and consequently introduce inaccuracies such that the device cannot be considered a sensitive instrument. It was in an effort to circumvent these deficiencies that the subject invention was conceived. In the subject invention, every effort has been made to introduce bearings and other low friction components so as to reduce the objection to the commonly encountered means and, as a consequence, the subject invention can be employed for control devices where the insensitivity of the normally employed means would make it impossible to accomplish the control objective. Other advantages of the subject invention will become apparent as the device is described below.

The specific application we have in mind in making this invention is the control of the fuel for an external combustion engine in which the air/fuel ratio is far beyond the stoichiometric ratio of 14/1 (possibly 40/10 or even 100 or 140 to 1). With such an engine (as illustrated) an increase in power follows an increase in fuel (which is not always true of ordinary internal combustion engines) along a substantially straight-line chart. The specific illustration herewith of our invention deals with the control of the fuel flow to an afterburner of a gas turbine in which the exhaust contains large quantities of free oxygen, but we do not wish to be restricted to such an application.

Figure 1 is an end view of the mechanism which is the subject of the invention.

Figure 2 is a detail of Figure 1, removed from its location, so that its geometry can be studied.

Figure 3 shows graphically the type of performance obtainable with this device.

Figure 4 illustrates one application of the invention for controlling afterburner fuel flow to a gas turbine of the conventional type.

Figure 5 illustrates the type of performance one obtains from such a device as shown in Figure 4.

Figure 1 embodies the basic features of the subject invention and illustrates the general principles of operation thereof. The pipe 50, the pressure pick up conduit, applies one of the two variable pressures $P_4$ and $P_6$, in this case $P_4$, for example, to the interior of bellows 78. The chamber 26 surrounding the bellows 78 is maintained at the other variable pressure by pipe 21 which forms a communication passage between the chamber 26 and the source of such pressure. The pressure in chamber 26 is applied to the outside of the bellows 28 which is located in chamber 26 (Figure 1) and for purposes of this description, bellows 28 may be considered to be evacuated. The lower portion of this bellows is mounted on a fork 38 and this fork, in turn, is mounted on the two pins 40 and 42 in the walls 27 surrounding chamber 26. This pin 42 is keyed to the fork 38. Pinned to the shaft 42 is a lever 44 and this lever 44 is connected to a suitable servomotor 24. Link 34, (Figure 2) on its left hand end has a pin 36, this pin 36 is connected to a strap 32 which is connected to a nut 30 at the upper end of the bellows 28. This link 34 is also connected through a pin 80 to the bellows 78. The right hand end of this lever 34 is mounted in a suitable bearing by a pin 92 which serves as the fulcrum of the system. As shown, the axis of pin 36 is coincident with the axis of the two pins 40 and 42. This configuration represents the equibrium position of the mechanism. The restoration of the mechanism to the condition of equilibrium after it has been displaced therefrom is caused to take place because of the action of the servo mechanism which will now be described.

The two members 38 and 44 are mechanically joined through shaft 42 so as to rotate together the same amount. The link 34 is permitted a limited motion between the stops 88 and 90, as shown in Figure 4. The links 74 and 76 transmit the motion of link 34 to a servomotor valve 58 which controls the admission of high pressure fluid from the pipe 60 through a passage 66 in the valve 58 to the chamber 70 below the valve 58. The valve 58 is thus balanced, in that high pressure fluid is acting both above and below. The annular chamber 64 is provided in the valve 58 which is shown connected to the low pressure outlet 62. Valve 58, when it is moved up and to the right by the clockwise motion of the link 34 admits high pressure fluid to the left hand side of the piston 54 of the servomotor 24. When the link 34 is moved counterclockwise, high pressure fluid is applied to the right hand side of the piston 54. The piston rod 52 is connected to the link 44 through the link 48. As the link 44 is moved the inclination of bellows 28 is changed and as a consequence, the line of action of the force resulting from the pressure acting on the effective area of bellows 28 is changed. If the center line of bellows 28 is changed, then the effective component of the force exerted by the bellows 28 is also changed. The practical result is that a change in fuel flow follows in pipe 20 so as to maintain a fuel flow in accordance with any measured value of R as illustrated in Figure 5 which will be described hereafter. This change in line of action will progress until the system reaches equilibrium and the resulting inclination of bellows 28 will be a function of the ratio of the pressure in chamber 26 to that in bellows 78.

Functionally, this relationship is shown graphically in Figure 3 where the angle $\theta$ is the angle between the line of action of bellows 28 and the vertical as shown in Figure 2. The motion of the lever 44 and/or the servomotor piston 54 driving 44 can be used as an indication of the pressure ratio. For example, by means of a link 56 rotating a pointer 23, as shown in Figure 4, and/or the motion of rod 56 can be employed to rotate a fuel valve 22 to increase or decrease fuel flow from a passage 73 to an afterburner fuel nozzle 20 as indicated in Figure 4. Scale 25 indicates the position of the pointer 23.

In Figures 2 and 3

$A_1$ = effective area of bellows 78
$A_2$ = effective area of bellows 28
$L_1$ = moment arm of force exerted by bellows 78
$L_2$ = moment arm of force exerted by bellows 28 when it acts at right angles to line 36—92
$\theta$ = angle through which the force exerted by bellows 28 acts when it is inclined to the perpendicular line to line 36—92

These Figures 2 and 3 illustrate the operation of the device whereby the desired relationship between the variable angle $\theta$ and the ratio between $P_6$ — (pressure downstream of turbine 16), and
$P_4$ — (pressure downstream of compressor 12) is maintained.
$K$ — is a constant which determines the characteristic of curve—Figure 3.

The gas turbine to which this device may be applied is shown with an air entrance 10 and a blower 12 in a cylindrical chamber 11 which contains the combustion chamber 46. The shaft 13 carries the turbine 16. The burners 14 provide the fuel for supplying energy to the turbine 16. Valve 84 admits the fuel through a pipe 82 and a link 86 controls this flow by means not shown. 72 is the afterburner chamber containing the afterburner pipe 20.

The clam shell outlets 18 from this afterburner chamber 72 may be adjusted mechanically or by automatic means, and the position of the clam shell 18 determines the pressure in chamber $P_6$. The result of the change in the area of clam shell 18 is to cause change in the flow of fuel in the afterburner 20 by the apparatus described.

In Figure 5 the broken line indicates engine requirements and the full line indicates the fuel flow which is plotted against the value of the ratio $$\frac{P_6}{P_4}$$

When the two lines cross indicates the equilibrium point at which the fuel flow corresponds to engine requirements.

Assume that the exit controlled by clam shell outlets 18 is opened up, then the pressure $P_6$ falls. The ratio $$R = \frac{P_6}{P_4}$$

also falls and the fuel flow increases along the fuel line of Fig. 5 until it crosses the broken line "engine requirements." The lowered pressure $P_6$ in chamber 26 causes the two bellows 28 and 78 to expand. Servovalve 64 rises and moves to right. Piston 54 is moved to right by the hydraulic fluid under pressure admitted through pipe 60. More fuel then flows up pipe 72 and pressure $P_6$ in chamber 72 rises; eventually equilibrium is restored, but now the bellows 28 is inclined to the right of where it was before the clam shell valves 18 were opened. In this new position of the control mechanism, a new ratio of $$\frac{P_6}{P_4}$$

is called for.

What we claim is:

1. Differential pressure apparatus comprising in combination two pressure responsive elements, the first element being adapted to be connected to a separate and distinct first pressure source, a chamber enclosing and supporting said first element, said chamber being adapted to be connected to a second pressure source so that the first element exerts a pressure in accordance with the pressure difference between first and second pressure sources, a lever, a fulcrum therefor inside said chamber, said first element being operatively connected so as to move said lever as said difference of pressure changes, a second pressure responsive element sealed and so mounted as to oscillate inside said chamber so as to expand and contract as said second pressure varies, one end of said second element being pivotally connected to said lever, the other end being pivotally mounted inside said chamber so that it can act at various angles with reference to the line of action of the first element, servo-mechanism including a servo-valve connected to said lever, a servo-motor so connected to said second element as to vary its inclination with reference to the line of action of the first element a controlled element connected to said servo-motor.

2. A device as set forth in claim 1 in which there is a first C-shaped support for the inner end of said second pressure responsive element, a pivot in one end of said first C-shaped support pivotally mounted in the wall of said chamber and a second C-shaped support rigidly connected to the outer end of said second pressure responsive element, the inner end of said second C-shaped element being normally located within said first C-shaped element and pivotally connected to said lever, said first C-shaped element being rigidly connected to said servo-motor and to said controlled element.

3. A device as set forth in claim 2 in which the pivot supporting the first C-shaped element and the pivot connecting said second C-shaped element with said lever are in axial alignment whenever the controlled element ceases to move and the apparatus is in equilibrium.

4. Motion transmitting mechanism for use in a system for controlling and varying the ratio of pressures in a first and second chamber comprising a third chamber a first and second pressure responsive elements, which are mounted in said third chamber, said first element being connected to said first chamber and mounted onto the wall of said third chamber, said third chamber being connected to said second chamber so that the first element exerts a force in accordance with the pressure difference between said first and second chambers, a lever, a fulcrum therefor both located inside said third chamber, said first element being operatively connected so as to move said lever as said difference in pressure varies, said second pressure responsive element being sealed and mounted in said third chamber so as to expand and contract as the pressure in said third chamber and in said second chamber falls and rises, one end of said second element being pivotally connected to said lever, the other end being pivotally mounted inside said third chamber so that the line of action through said second element acts at a variable angle to said lever with reference to the line of action of said first element and the expansion of said first element is opposed by the expansion of said second element, servo-mechanism including a servo-valve connected to said lever, a servo-motor connected to said second element so as to vary its line of action, a controlled element connected to said servo-motor.

JOHN H. STRESEN REUTER.
JOHN T. KARPUS, JR.

References Cited in the file of this patent

UNITED STATES PATENTS

| Number | Name | Date |
|---|---|---|
| 2,117,800 | Harrison et al. | May 17, 1938 |
| 2,285,540 | Stein et al. | June 9, 1942 |
| 2,394,284 | Berges | Feb. 6, 1946 |
| 2,446,339 | Orr | Aug. 3, 1948 |
| 2,507,606 | McLeod | May 16, 1950 |
| 2,544,427 | Ifield | Mar. 6, 1951 |
| 2,545,703 | Orr | Mar. 20, 1951 |